March 14, 1967 HIDENORI TONOOKA 3,309,057

METHOD OF STARTING OPERATION OF PUMPS AND PUMP TURBINES

Filed March 11, 1964

INVENTOR
Hidenori Tonooka

BY Paul M. Craig, Jr.

ATTORNEY 3,309,057
METHOD OF STARTING OPERATION OF PUMPS AND PUMP TURBINES
Hidenori Tonooka, Hitachi-shi, Japan, assignor to Hitachi, Ltd., Tokyo, Japan, a corporation of Japan
Filed Mar. 11, 1964, Ser. No. 351,143
2 Claims. (Cl. 253—1)

This invention relates to an improved method of starting a pump which has a row of adjustable guide vanes arranged circumferentially around the pump runner for control of the rate of flow and a discharge valve arranged at the exit end of the pump casing for interruption of the discharge flow.

The term "pump" as used in this specification and in the appended claims includes not only ordinary pumps of the type described above but also pump-turbine units of the same type.

In starting a large-capacity pump by means of a motor, it is a well-known practice to employ compressed air to depress or force down the water around the pump runner so that it can be rotated by the motor freely with only minimum resistance from the water. This reduces not only the power required for the starting but also the time therefore. In one previous procedure, the discharge valve is completely closed without closing the guide vanes and then compressed air is introduced to depress the water lying in the pump casing and inside the row of guide vanes to a minimum level. This procedure, however, requires both a large supply of compressed air and an extended starting time. For this reason, an alternative procedure has been more commonly employed in which only the guide vanes are closed without closing the discharge valve for the purpose of forcing down only the water level inside the row of guide vanes. In such procedure, the motor begins to rotate the pump runner after the forcing down of the water. When the speed of the runner reaches a specified value, the compressed air in the pump is discharged. The pump will then be primed, that is, the space around the runner is filled again with water. Upon the pressure inside the row of guide vanes reaching a value higher than that of the water in the casing or the discharge pipe, the guide vanes are opened to start pumping. However, great difficulties are often encountered in pumping in this manner.

Through many experiences and through many experiments, applicant has become convinced that the substantial pressure difference between the inside and outside of the row of guide vanes causes separation of the water column. Hence water hammering or interruption of the flow of water are subsequently observed particularly when some air remains around the runner or any violent whirl is caused in the suction pipe. Once the water separation occurs, the runner becomes ineffective so that the water flows back from the casing side to the runner side causing a heavy water hammering effect which may result in damage as well as failure to pump properly.

The present invention is intended to prevent such water hammering in the starting of pump units.

The present invention will now be described with reference to the accompanying drawing, in which.

Figure 1:
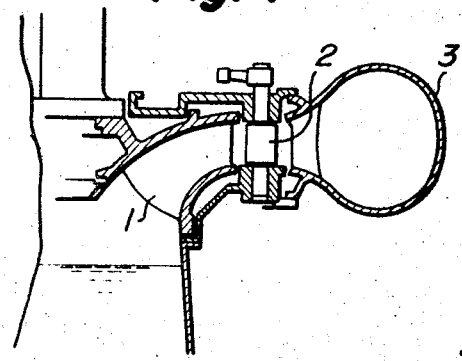
FIG. 1 is a fragmentary vertical cross section of a typical pump-turbine unit to which the method of starting operation of this invention is applicable.

Referring to the drawing, the pumping operation is started by the following steps according to the invention: first both the guide vanes 2 and the discharge valve 4 are closed; secondly, compressed air is supplied under high pressure to the space inside of the row of guide vanes 2 to depress the water level; third the pump runner 1 is started slowly and brought up to final speed with the guide vanes 2 and the discharge valve 4 held closed; fourth, the guide vanes are opened partially to an appropriate intermediate extent, and fifth the discharge valve is opened to a required extent and the guide vanes are further opened to their required extent. The pump is then considered to be in operation and pumping properly.

By this procedure, water is allowed to flow slowly through the row of guide vanes 2 to the outside thereof before the discharge valve 4 is fully opened. This is accomplished without any disturbance in the pressure in the casing 3 which becomes higher than that in the discharge pipe 7. In this manner, any separation of water is effectively prevented thus assuring continuous delivery of water. It will be appreciated, therefore, that the inventive starting procedure enables the pump to start without involving any water hammering effect with its consequent undesirable aspects.

Figure 2:
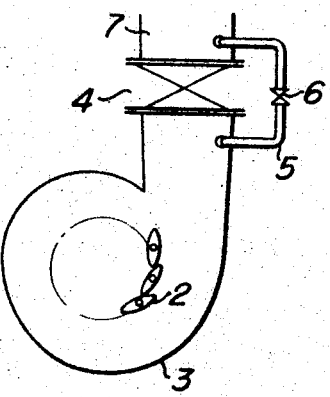
FIG. 2 is a plan view of a part of the unit shown in FIGURE 1 in a reduced scale.

In employing the method of the present invention, a by-pass pipe 5 and by-pass valve 6 preferably arranged as illustrated in FIGURE 2, may be used to compensate for water loss by leakage through the closed row of guide vanes during the period of depression set forth in step 2 above. In this case by-pass valve 6 is opened to supply water until the desired rotation speed of the runner is established. At the end of step 3 upon the runner reaching its final speed, the space around the runner 1 is filled with water. At this point, the by-pass valve 6 is closed and step 4 above is carried out. Upon completion of step 4, and at the start of step 5, the by-pass valve 6 is again opened.

Figure 3:
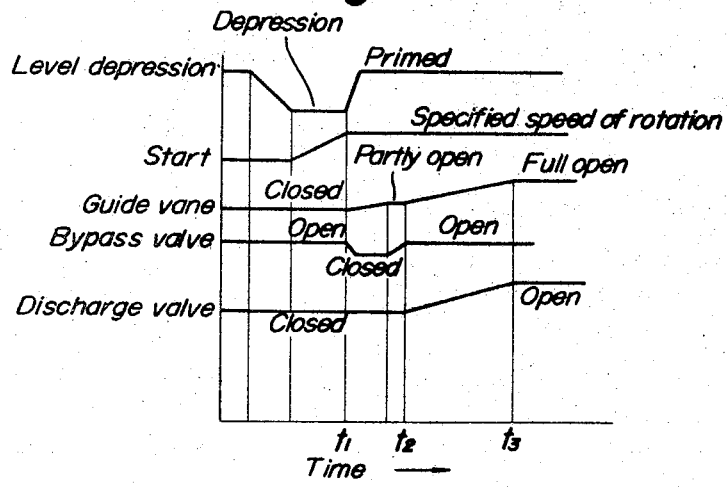
FIG. 3 is a timing chart showing the starting operation according to the invention.

The above procedure of starting pump operation is graphically illustrated in the timing chart of FIG. 3. As seen in this figure, the guide vanes and the discharge valve are held closed during the time when the water level is forced down for easier starting of the runner. To commence water delivery, the guide vanes are first partially opened at time $t_1$ only to an appropriate intermediate extent. Then at time $t_2$ the discharge valve starts to open as the guide vanes are further opened. As observed, the guide vanes as well as the discharge valve are opened to a full extent at time $t_3$ where it is considered that the pump is in full operation and pumping water properly.

From the foregoing description, it can be appreciated therefor that the invention provides a novel method for starting pumps and pump-turbine units wherein water hammering and its consequences are prevented during starting and thereafter during running of the pump.

Having described several methods of practicing the invention, other methods will be suggested to those skilled in the art in the light of the above disclosure. It is therefor to be understood that all such variations and modifications that come within the scope of the present invention are intended to be covered, as defined by the appended claims.

What is claimed is:

1. A method of starting operation of a pump of the type including a row of adjustable guide vanes around a pump runner and a discharge valve in the outlet comprising: first closing said guide vanes and the discharge valve, second forcing down the level of water by compressed air to a minimum level with respect to the pump runner to free said pump runner for easier rotation, third rotating the pump runner and bringing it up to desired operating speed with the guide vanes and the discharge valve held closed, fourth partially opening the guide vanes to an appropriate intermediate extent while keeping the discharge valve held closed whereby the pressure in the space between the guide vanes and the valve is gradually equalized with the pressure in the space on the runner side of the guide vanes, and fifth subsequently opening the discharge valve to a required extent while opening the guide vanes the remainder of the way to their required extent.

2. The method of starting operation of a pump according to claim 1, further characterized in that a controllable by-pass means is provided which shunts said discharge valve and wherein during step 3 while the runner is being brought up to speed and the guide vanes and discharge valve are closed, the by-pass means is open and wherein at the beginning of step 4 upon the guide vane 4 starting to be partially opened, the by-pass means is closed.

References Cited by the Examiner
UNITED STATES PATENTS

| | | | |
|---|---|---|---|
| 3,236,498 | 2/1966 | Kerensky | 253—143 |
| 3,237,564 | 3/1966 | Hartland | 253—143 |
| 3,238,534 | 3/1966 | Hartland | 253—1 X |

MARTIN P. SCHWADRON, *Primary Examiner.*

SAMUEL LEVINE, *Examiner.*

E. A. POWELL, Jr., *Assistant Examiner.*